G. BAXTER.
METHOD OF HUSKING IVORY NUTS.
APPLICATION FILED SEPT. 10, 1920.

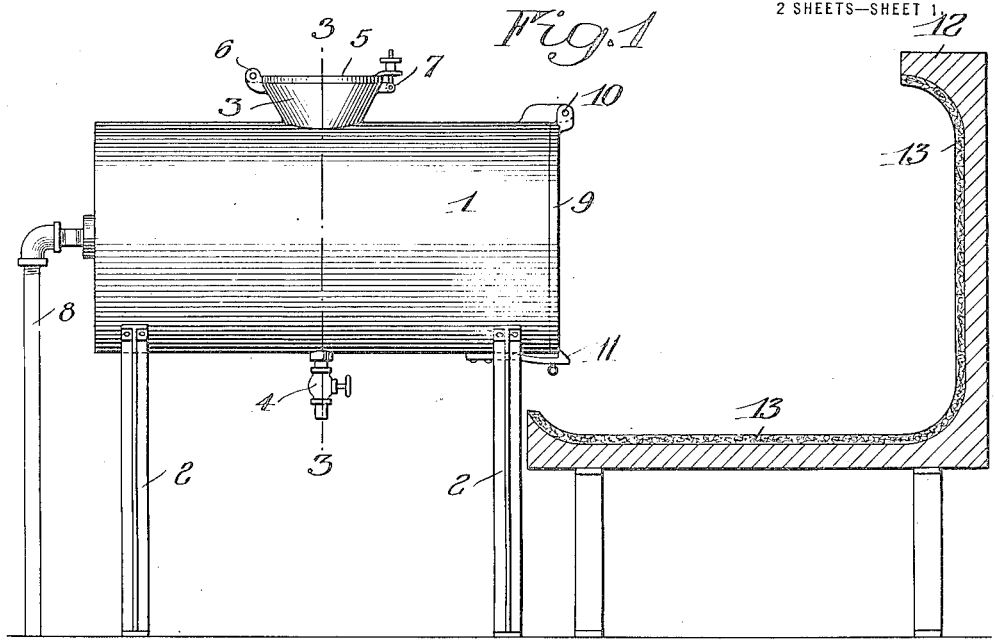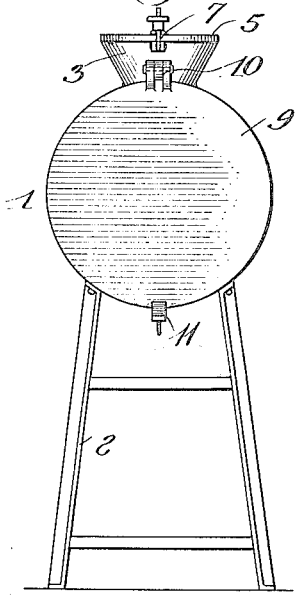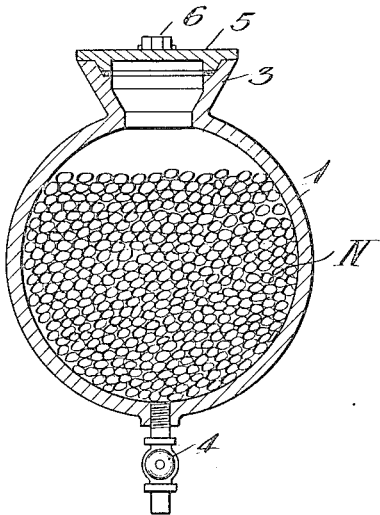

1,433,928. Patented Oct. 31, 1922.
2 SHEETS—SHEET 2.

INVENTOR.
George Baxter
BY
his ATTORNEY

Patented Oct. 31, 1922.

1,433,928

UNITED STATES PATENT OFFICE.

GEORGE BAXTER, OF ROCHESTER, NEW YORK.

METHOD OF HUSKING IVORY NUTS.

Application filed September 10, 1920. Serial No. 409,351.

*To all whom it may concern:*

Be it known that I, GEORGE BAXTER, of Rochester, in the county of Monroe and State of New York, have invented certain new and useful Improvements in Methods of Husking Ivory Nuts; and I do hereby declare the following to be a full, clear, and exact description of the same, reference being had to the accompanying drawings, forming a part of this specification, and to the reference numerals marked thereon.

My present invention relates to the preparation of vegetable ivory and more particularly to the initial treatment of the nuts from which the ivory is obtained and the invention has for its object to provide a simple, cheap and rapid method of husking the nuts before presenting them to the sawing machine. A further object of the invention is to provide a husking process that will also improve the quality of the ivory, aside from removing the outer covering of the nut centers. To these and other ends the invention resides in certain improvements and combinations of parts all as will be hereinafter more fully described, the novel features being pointed out in the claims at the end of the specification.

In the drawings:

Figure 1 is a side view, partly in longitudinal section, of an apparatus adapted for use in carrying out my process or method;

Figure 2 is an end view thereof;

Figure 3 is an enlarged transverse section on the line 3—3 of Figure 1;

Similar reference numerals throughout the several views indicate the same parts.

Figure 4:
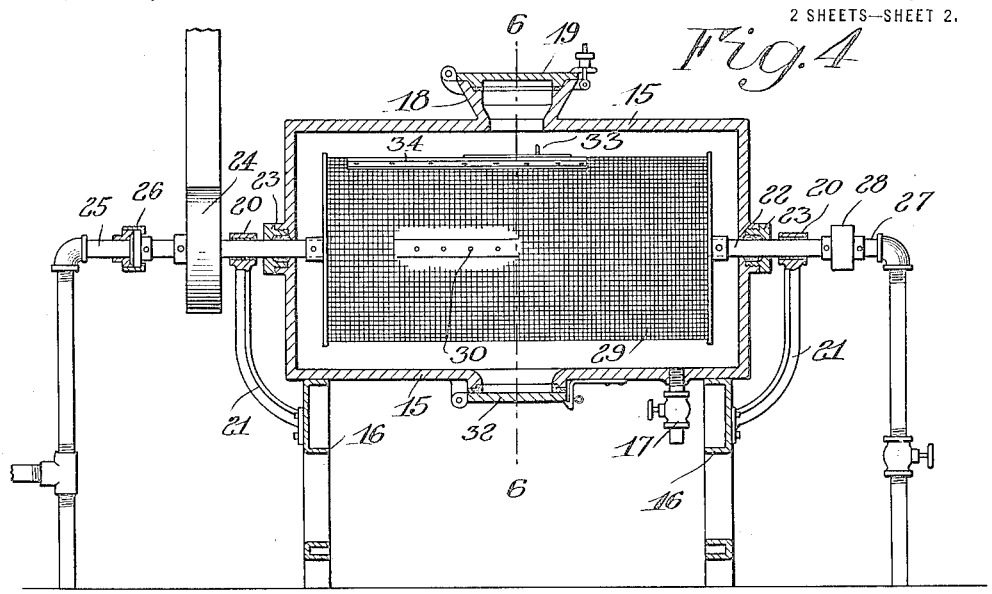
Figure 4 is a longitudinal central section through a modified apparatus.

Ivory nuts are a well known article of commerce native to South America; are about the size of a hen's egg and consist of a hard solid center resembling a good grade of animal ivory and covered with a thin, tough and fibrous close-clinging husk which it has been found very difficult to remove. The usual process of husking is a long one, requiring many days and involving heating and pounding the nuts on the theory that relative differences in the expansion and contraction of the centers and husks loosens the latter. One disadvantage of this heating or baking is that it is apt to concentrate and bake upon portions of the nut an oily constituent thereof and as the ivory is used principally or largely for the manufacture of buttons which are dyed or colored, this oil interferes with the coloring process, causing the dye to be unevenly absorbed. In the practice of my invention, the husks are removed almost instantaneously and such oil as is concentrated in the process is extracted.

Referring first to Figures 1, 2 and 3 of the drawings, 1 indicates a horizontal cylinder or boiler supported upon frames 2 and provided with a hopper 3 at the top for the introduction of the nuts and with a drain cock 4 at the bottom. The hopper 3 may be tightly closed by a door 5 pivoted at 6 and clamped in position by a swinging bolt 7. At one end a steam pipe 8 communicates with the interior of the boiler while the opposite end is closed in a steam-tight manner by a door 9 hinged at the top as at 10 and secured by suitable locking device 11 at the bottom, which device must be of a nature permitting it to be quickly released while the cover is under high pressure from within. Opposite this openable end of the boiler, I place an L-shaped buffer 12 as high or higher than the boiler and padded at 13, the buffer being arranged generally in a manner to catch the contents of the boiler when the door 9 is opened.

In carrying out my process, I fill the boiler 1 with the nuts N, as shown in Figure 3. clamp down the hopper lid 5 and the door 9, sealing the boiler, and I then introduce through pipe 8 live steam at a pressure, preferably, of about 150 pounds. The cock 4 may be used to expel the air when the steam is first turned on. I hold the boiler under this steam pressure with the steam in direct contact with the nuts for about ten minutes and then, without reducing the pressure, suddenly open the door 9 by releasing the device 11. The door is blown to a wide open position by the force of the steam which also expels the nuts and these are caught by the buffer 12 without injury. The steam not only softens the husks but expands them before the centers have become hot and are still contracted and then sufficient of the steam at the high pressure is trapped between the center and the husk so that when the pressure is suddenly relieved by the opening of the door, the husks are literally blown off.

Figure 5:
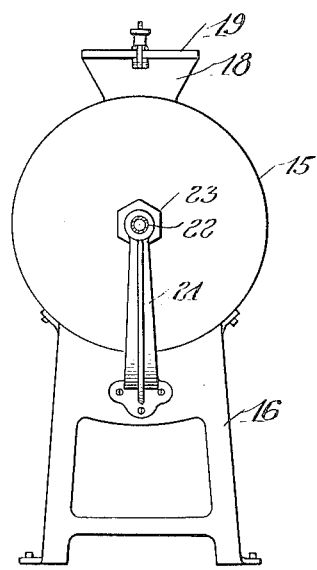
Figure 5 is an end view thereof.
Figure 6:
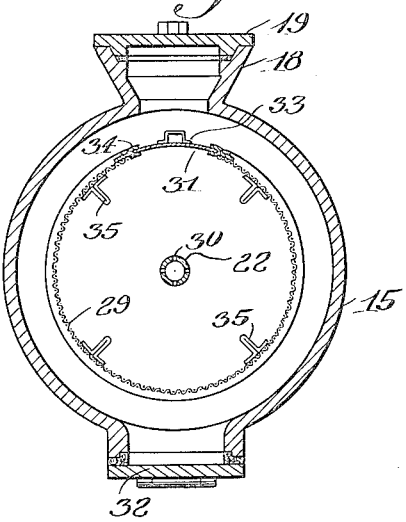
Figure 6 is an enlarged transverse section on the line 6—6 of Figure 4.

Referring to Figures 4, 5 and 6, in the modified apparatus there shown, I provide a similar cylinder or boiler 15 supported upon frames 16 and provided with a drain cap 17 at the bottom and a hopper 18 at the top closed by a lid 19, the same as before. Mounted in bearings 20 carried on bracket arms 21 rising from the supports 16 is a bellow shaft 22 that passes through stuffing boxes 23 in the end walls of the boiler. It is driven by a pulley 24 and at one end connects with a fixed steam pipe 25 through a stuffing box 26 and at the other end with a fixed compressed air pipe 27 through a stuffing box 28. Within the boiler, the shaft 22 carries a foraminous or meshed cylinder 29 and the hollow shaft is perforated at 30 to admit steam or air to the interior thereof. An opening 31 in one side of the cylinder or basket 29 may be successively alined with the hopper 18 to receive the nuts or with a door 32 in the bottom of the boiler through which the nuts may be dumped. This opening 31 is closed by a sliding door 33 operating in guides 34.

This apparatus may be used the same as the other by introducing the steam through the pipe 25 and relieving the pressure through the door 32, the nuts, however, not being projected but being later dumped from the rotary basket 29. However, I have gotten good results in the way of rapid husking and also obtained a cleaner extraction of the oily component of the nut by proceeding as follows: I introduce the steam at a pressure of from 90 to 110 pounds and hold from fifteen minutes to two hours. This softens the husk and opens the pores of the center also causing expansions that tend to loosen the husk. During this process I agitate the nuts by tumbling them about through rotation of the shaft 22 and basket 29, the latter being preferably provided on its interior with a number of lifting ribs or veins 35 to assist in the thorough mixing of the nuts. I then reduce the steam pressure through the cock 17 and drain off the water and introduce hot air through the pipe 27 at a gradually increasing temperature to 100°. This dries the nuts, drawing the moisture and oils out of the pores which have been opened by the steam. During the steaming process, I prefer to rotate the basket 29 at about 30 to 60 revolutions per minute.

Through the use of my invention, the manufacturer is not required to carry such large stocks of raw material on hand as the nuts may be husked as soon as received instead of going through a long process requiring many times the day's supply to be constantly kept on hand at one stage or another of the husking process. Furthermore, my invention produces a cleaner and better product, free from oil or, at least, with its texture so uniform that the later coloring process, if buttons or other dyed articles are to be made, is not interfered with.

I claim as my invention:

1. The method of husking ivory nuts which consists in collectively confining a quantity of said nuts piled together in a closed chamber, subjecting them to steam pressure until the live steam has permeated and collected beneath the husk thereof and then suddenly relieving such pressure.

2. The method of husking ivory nuts which consists in collectively confining a quantity of the nuts piled together in a sealed chamber, introducing live steam into said chamber and maintaining the nuts for a period under the pressure of said steam and then suddenly opening the chamber to instantaneously relieve the pressure and project the nuts from the chamber.

3. The method of husking ivory nuts which consists in subjecting them successively to the action of steam and hot air.

4. The method of husking ivory nuts which consists in subjecting them successively to the action of steam under pressure and hot air while the nuts are enclosed in a sealed vessel.

5. The method of husking ivory nuts which consists in tumbling them in a closed vessel under live steam pressure and then introducing hot air to said vessel.

6. A method of husking ivory nuts which consists in confining them within a sealed vessel, introducing steam under pressure to said vessel, agitating the nuts and then introducing hot air to the vessel.

7. The method of husking ivory nuts which consists in subjecting the nuts to live steam under pressure until the steam has penetrated beneath the husk and a body of steam at such pressure is trapped between the husk and the impenetrable center of each nut and then suddenly reducing the steam pressure.

GEORGE BAXTER.